US006639377B2

(12) United States Patent
Iwaji et al.

(10) Patent No.: US 6,639,377 B2
(45) Date of Patent: Oct. 28, 2003

(54) DRIVING DEVICE FOR SYNCHRONOUS MOTOR

(75) Inventors: Yoshitaka Iwaji, Hitachi (JP);
Tsunehiro Endo, Hitachiota (JP);
Noriaki Yamada, Shimizu (JP);
Hiroshi Fujii, Chiba (JP); Kiyoshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 151 days.

(21) Appl. No.: 09/982,897

(22) Filed: Oct. 22, 2001

(65) Prior Publication Data

US 2002/0153857 A1 Oct. 24, 2002

(30) Foreign Application Priority Data

Mar. 8, 2001 (JP) ........................................ 2001-064317

(51) Int. Cl.$^7$ .............................. H02P 1/46; H02P 3/18; H02P 5/28; H02P 7/36
(52) U.S. Cl. .......................... 318/700; 318/85; 318/437; 318/136
(58) Field of Search ................................ 318/700, 714, 318/715, 717, 721, 722, 654, 655, 85, 437, 438, 136, 729; 323/205, 207

(56) References Cited

U.S. PATENT DOCUMENTS

| 5,656,911 | A | * | 8/1997 | Nakayama et al. | ......... | 318/718 |
| 6,043,624 | A | * | 3/2000 | Masaki et al. | .............. | 318/723 |
| 6,242,882 | B1 | * | 6/2001 | Kaneko et al. | ............. | 318/700 |
| 6,281,656 | B1 | * | 8/2001 | Masaki et al. | .............. | 318/700 |
| 6,531,843 | B2 | * | 3/2003 | Iwaji et al. | .................. | 318/727 |
| 6,555,988 | B2 | * | 4/2003 | Masaki et al. | .............. | 318/721 |

FOREIGN PATENT DOCUMENTS

| JP | 10229699 | A | * | 8/1998 | ........... H02P/21/00 |
| JP | 2000-236694 | | | 8/2000 | |
| JP | 2001008486 | A | * | 1/2001 | ............. H02P/6/16 |
| JP | 2001190099 | A | * | 7/2001 | ........... H02P/21/00 |

OTHER PUBLICATIONS

Heisei 12 National Conference of Industry Application Society of Institute of Electrical Engineers of Japan, Proceedings (III), No. 97 A *New Position Sensorless Control of Permanent Magnet Synchronous Motor using Direct Position Error Estimation*—Kiyoshi Sakamoto et al, pp. 963–966.

*Interior Permanent Magnet Motor*—Kaitaini, Matsubara, Watarai, Mitusbishi Denki Giho, vol. 73, No. 9, 1999, pp 68–71.

Proceedings for Joint Workshop of Semiconductor Power Conversion/Industry Power Electric Application of IEE of Japan, No. SPC 00–67, Position Sensorless Control for IPM Motor with Direct Axis Error Estimation; pp. 73–77.

*Theory and Actual Design of AC Servo System* Hidehiko Sugimoto, Sogodenshisyuppan, p. 78, Equation (4.6).

\* cited by examiner

*Primary Examiner*—Robert E. Nappi
*Assistant Examiner*—Edgardo San Martin
(74) *Attorney, Agent, or Firm*—Crowell & Moring LLP

(57) ABSTRACT

In order to provide a driving device for a motor having a capability equivalent to conventional vector control type sensorless method by simplifying the controls structure to reduce number of parts to be adjusted, and to stabilize the control system, a driving device for a synchronous motor does not include a speed controller or a current controller, and calculates a voltage impressed on a motor on coordinate axes (dc/qc axes) based on a magnetic pole axis. For calculating a voltage command, command values such as a rotation speed command and a current command are used, and Iq* corresponding to a torque current command is calculated and provided based on a detected current value.

13 Claims, 13 Drawing Sheets

DRIVING DEVICE FOR SYNCHRONOUS MOTOR

BACKGROUND OF THE INVENTION

1. Field of the Invention

The present invention relates to control of a synchronous motor, and especially relates to a control method for realizing a high precision and high performance driving device for a motor without sensors detecting the speed and the position of the motor.

2. Prior Art

The prior art for controlling a synchronous motor without detecting a magnetic pole position includes vector control type sensorless method which is based on vector control with speed and position sensors of a synchronous motor, and is provided with a magnetic pole position estimator 14P and a speed estimator 33 instead of using the speed and position sensors as shown in FIG. 21, and a method called V/F control for controlling a synchronous motor as an open loop shown in FIG. 22.

In the vector control type sensorless method shown in FIG. 21, the other part than a part for detecting magnetic pole position and a part for detecting speed is constituted as in vector control method with sensors.

In FIG. 21, 1 is a generator for ωr*, which is a rotating speed command, 2P is a controlling device for a motor, 3 is a PWM generator converting a voltage command into PWM pulses, 4 is an inverter, 5 is a synchronous motor, 6 is a current sensor for the synchronous motor, 7 is a conversion gain for converting a mechanical angular frequency into an electrical angular frequency, 9 is a dq coordinate converter for converting three-phase AC into a value on a rotation coordinate, 10 is an Id* generator generating a d axis current command Id*, 12 is a voltage command calculator, 13 is a coordinate converter for converting a value on the dq coordinate into a three-phase AC value, 14P is a magnetic pole position estimator estimating a magnetic pole position of the motor, 16 is an adder for adding (subtracting) signals, 21P is a speed controller for adjusting Iq* such that an estimated speed value matches the speed command, 24 is a current controller for correcting the voltage commands Vdc* and Vqc* such that detected current values Idc and Iqc match the respective command values Id*, Iq*, and 33 is a speed estimator for estimating the rotating speed of the motor.

In FIG. 21, the magnetic pole position estimator 14P corresponds to a magnetic pole position sensor, and the speed estimator 33 corresponds to a speed sensor. The speed controller 21P and the current controller 24 are provided as in a vector control device with speed and position sensors, and adjust such that the speed and the current match the respective command values. This type of vector control type sensorless method is described in "Heisei 12 National Conference of Industry Application Society of Institute of Electrical Engineers of Japan, Proceedings [III], No. 97, pp. 963–966 Position Sensorless Control for Permanent Magnet Synchronous Motor with Calculation for Directly Estimating Axis Error". Another sensorless driving technology for a synchronous motor is disclosed in "Interior Permanent Magnet Motor: Kaitani, Matsubara, Watarai, Mitsubishi Denki Giho, Vol. 73, No. 9, 1999, pp. 68–71"

The V/F control does not have an automatic adjusting part for the speed and the current, and determines a voltage impressed on a motor directly from a speed command as shown in FIG. 22. 2Q is a V/F control device, 15 is a zero generator for always setting Vdc* to zero, and 125 is a power generating coefficient gain corresponding to a power generating coefficient Ke of the motor in FIG. 22. The V/F control does not estimates a magnetic pole axis as in the vector control type sensorless method, and provides a very simple control structure. However, if a load changes abruptly while driving, it may generate a transient vibration. To restrain the transient vibration, Japanese application patent laid-open publication No.2000-236694 discloses a method adding a control loop for correcting the speed from the detected current value.

SUMMARY OF THE INVENTION

The vector control type sensorless method includes a speed controller and a current controller, and adjusting the control gains for them to appropriate values exploits a control capability of a motor. For that purpose, a magnetic pole estimator and a speed estimator should fully function in place of a position sensor and a speed sensor. However, since an actual calculation for the estimation is affected by a parameter fluctuation of a motor, or a delay in the calculation, accuracy comparable to that of a position or a speed sensor is not attained, and an estimation error always accompanies.

An estimation error for a magnetic pole axis is described in FIG. 23. A magnetic pole axis in a motor is defined as d axis. An orthogonal axis to the magnetic pole axis is defined as q axis. Estimated axes in a controller are defined as dc axis and qc axis. An axis error AO exists between them. If the pole estimation makes the axis error to zero, the relationship described in FIG. 24 is attained, resulting in an ideal vector control. Here, "ideal" means motor current is orthogonal to motor magnetic flux, and entire current component contributes to the torque.

However, an axial error exists in reality, and the vector control type sensorless method does not attain a sufficient capability for the speed control or the current control, and adjusting the control gains for them becomes difficult. When an unstable phenomenon arises, it is difficult to determine if the direct cause is the estimation error or the effect from the gain setting in the controller, thereby making the inquiry for the cause difficult. Also, for the vector control type senseless method, since a motor is driven at a high speed, a high speed calculation is required, and a low price microcomputer providing a low performance does not meet the requirement.

On the other hand, since the V/F control does not include parts requiring adjusting as in the vector control type sensorless method, it controls the speed of a motor variably without adjusting. However, the d and q axes do not match the dc and qc axes, it is difficult to attain an advanced control. A vector chart for the relationship between the voltage and the current for the V/F control is shown in FIG. 25. In the V/F control, a voltage axis is qc axis, and as the load increases, the axis error becomes larger accordingly. Thus, disturbance such as a load torque fluctuation may cause a problem such as a vibration or an over current.

The purpose of the present invention is to reduce the number of parts requiring adjusting by simplifying the control structure, thereby stabilizing the control system, resulting in providing a driving device for a motor having a comparable capability as the conventional vector type sensorless method.

A driving device for a synchronous motor of the present invention calculates voltages impressed on a motor on coordinate axes (dc/qc axes) based on the magnetic pole axis as in vector control. The driving device for a synchronous motor of the present invention does not include an automatic adjusting part such as a speed controller or a current controller, and a command value such as a rotation speed command and a current command is used for calculating a voltage command. Iq*, which corresponds to a torque current command, changes depending on a load condition of a motor, and is provided by calculating based on a detected current value.

DETAILED DESCRIPTION OF THE INVENTION (Description of the Preferred Embodiment)

The following section uses figures to describe embodiments of the present invention. The same codes in the individual figures refer to the same constitution elements.

(Embodiment 1)

Figure 1:
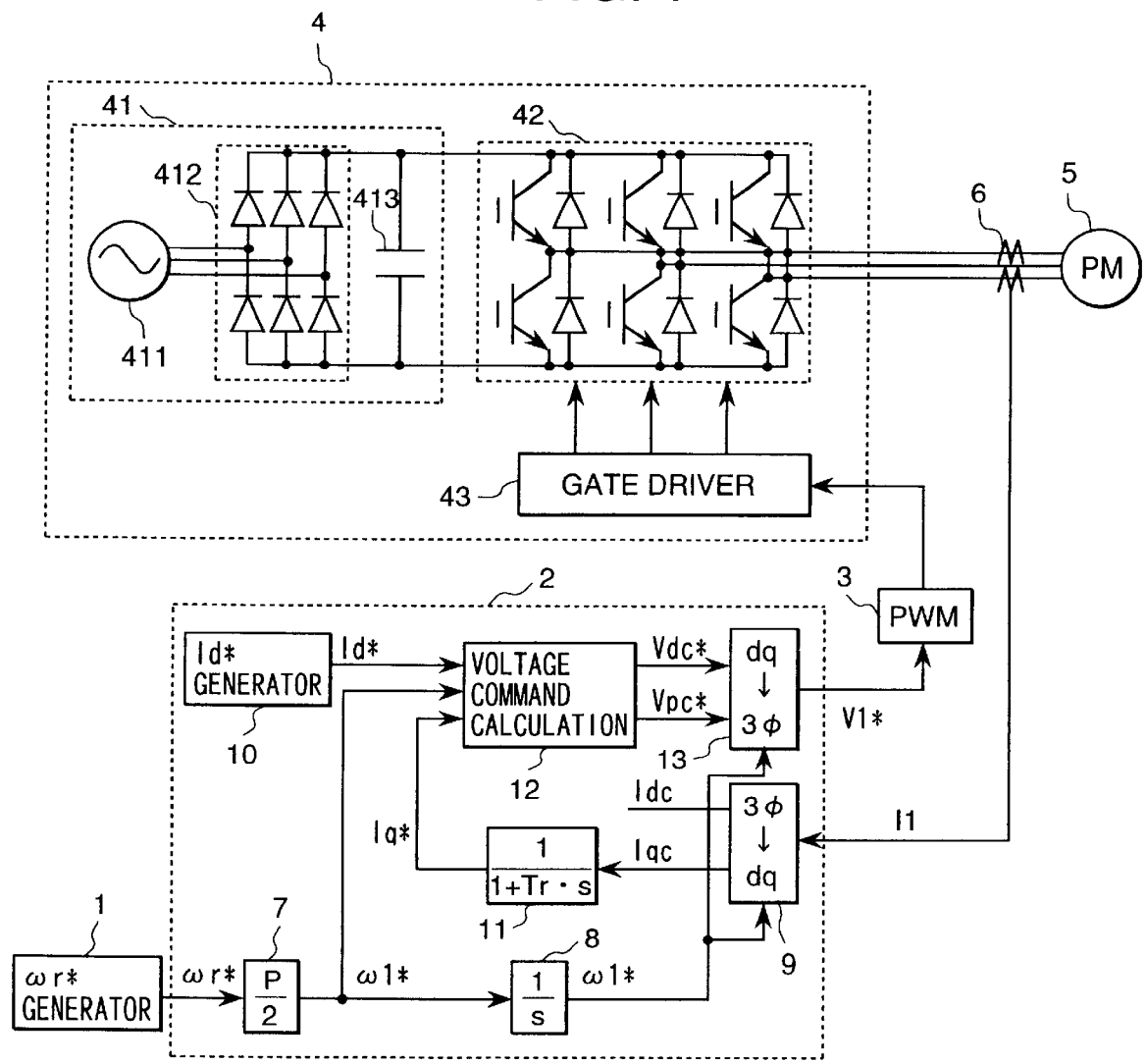
FIG. 1 shows a block diagram for Embodiment 1.

FIG. 1 shows a constitution of the present embodiment. In FIG. 1, 1 is a speed command generator providing a motor with a rotation speed command ωr*, 2 is a controlling device calculating a voltage impressed on the motor, 3 is a PWM (Pulse Width Modulation) pulse generator generating pulses driving an inverter 4 based on a voltage command V1*, 4 is the inverter driving the motor, 5 is the synchronous motor (referred as motor hereafter) as a control subject, 6 is a current detector detecting the current of the motor 5, 7 is a conversion gain converting the rotation speed command ωr* into an electric angular frequency command ω1* of the motor (P is the number of poles of the motor), 8 is an integrator calculating an AC phase θc inside the controlling device based on the electric angular frequency command ω1*, 9 is a dq coordinate converter converting a current value on a three-phase AC axis to components on dc/qc axes, which are rotation coordinate axes, 10 is an Id* generator providing an current command Id*, which is a magnetic pole axis component of the motor, 11 is an Iq* generator, 12 is a voltage command calculator calculating voltage commands Vdc* and, Vqc* on the dc/qc axes based on ω1*, Id*, and Iq*, 13 is an inverse converter converting the voltage commands Vdc* and Vqc* on the dc/qc axes into a value on the three-phase AC axis, 41 is a DC power supply constituting a main circuit power supply for the inverter 4, 42 is a main circuit of the inverter, 43 is a gate driver generating gate signals to the main circuit, 411 is a three-phase AC power supply supplying power to the inverter 4, 412 is a diode bridge rectifying the three-phase AC power supply, and 413 is a smoothing condenser restraining a pulsating component in the DC power supply.

Figure 2:
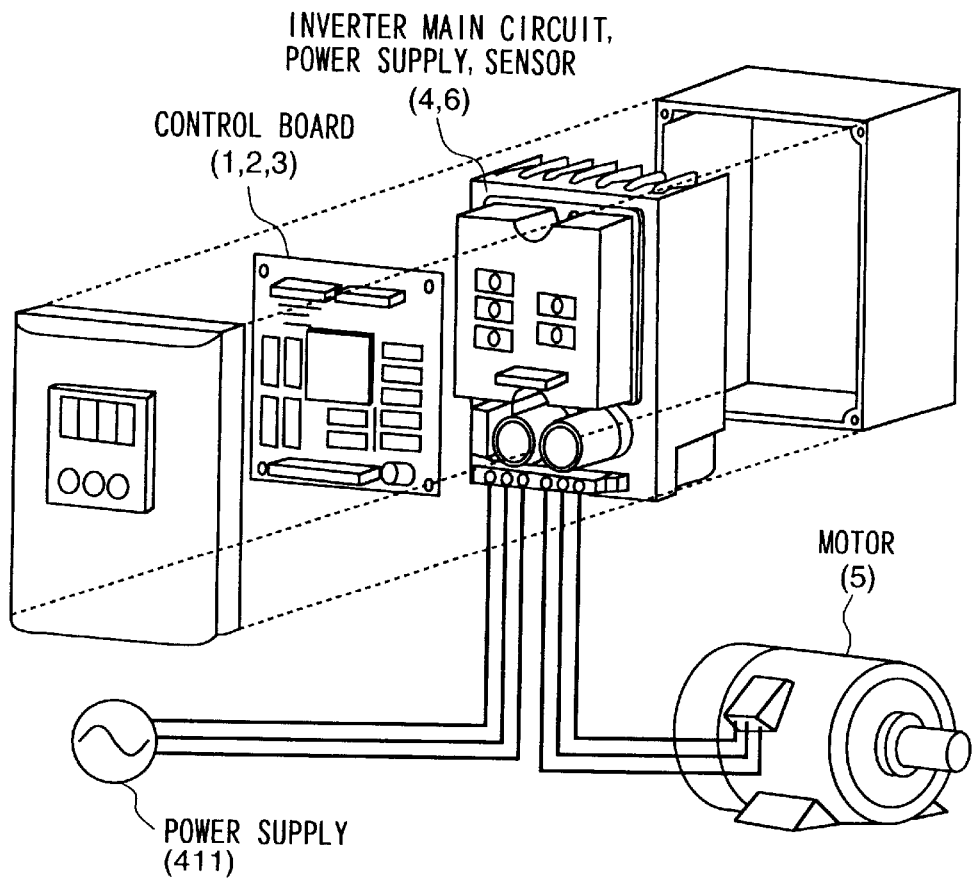
FIG. 2 shows a constitution schematic of a device implementing the present invention.

FIG. 2 shows a constitution schematic of the present embodiment. The present embodiment is provided with the AC power supply 411, a controlling/inverter part, and the motor 5. As indicated in FIG. 2, a control board in the controlling/inverter part is provided with the speed command generator 1, the controlling device 2 calculating the voltage impressed on the motor, and the PWM generator 3. They are realized as digital circuits based on a microprocessor. The inverter 4 and the current detector 6 are implemented in the same device.

The following section describes the operation of the present embodiment based on FIG. 1. The electric angular frequency ω1* for the motor is obtained as an output from the conversion gain 7 based on the speed command ωr*. The phase calculator 8 integrates ω1* to obtain the AC phase θc in a controller. A detected value of the three-phase AC current is converted into another coordinate system based on the AC phase θc, thereby obtaining Idc, which is a dc axis component and Iqc which is a qc axis component. The Iq* generator calculates Iq* based on the Iqc. The Id* generator generates a prescribed Id*. If the structure of a rotor of the motor is non-salient, Id*=0 is provided. The voltage command calculator 12 calculates Vdc* and Vqc*, which are voltages impressed on the motor 5 based on the rotating speed ω1*, and current commands Id* and Iq*. The equations for the calculation are described below.

$$Vdc^* = R \cdot Id^* - \omega 1 \cdot Lq \cdot Iq^*$$
$$Vqc^* = \omega 1^* \cdot Ld \cdot Id^* + R \cdot Iq^* + Ke \cdot \omega 1^* \qquad \text{Equation (1)}$$

In the equation above, R: Motor resistance, Ld: d axis inductance,

Lq: q axis inductance, and Ke: Power generation constant.

Equations in Equation 1 are the same equations used in the conventional vector control, and are described in "Theory and Actual Design of AC Servo System: Hidehiko Sugimoto, Sogodenshisyuppan, P. 78, Equation (4.6)"

The Vdc* and Vqc* obtained from Equation (1) are converted into the voltage command value V1* on the three-phase AC axis. Then, the PWM generator 3 converts the voltage command V1* into a pulse width. The gate driver drives switching elements based on the pulse signal, thereby impressing voltages corresponding to Vdc* and Vqc* on the motor 5.

Figure 3:
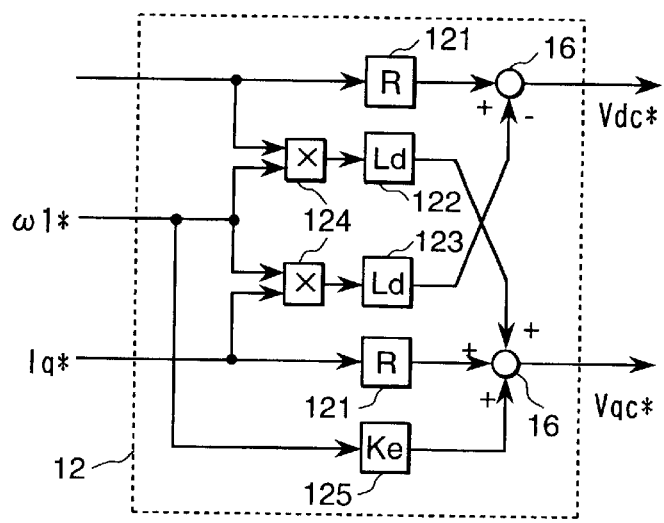
FIG. 3 shows a block diagram for a voltage command calculator of Embodiment 1.

The following section describes operations in the individual parts. The voltage command calculator 12 calculates the voltage commands based on the Equation (1). FIG. 3 represents Equation (1) as a block diagram. In FIG. 3, 121 is a gain corresponding to the resistance (R) of the motor. 122 is again corresponding toad axis inductance (Ld), 123 is a gain corresponding to a q axis inductance (Lq), 124 is a multiplier, and 125 is a gain corresponding to the power generation constant (Ke).

Figure 24:
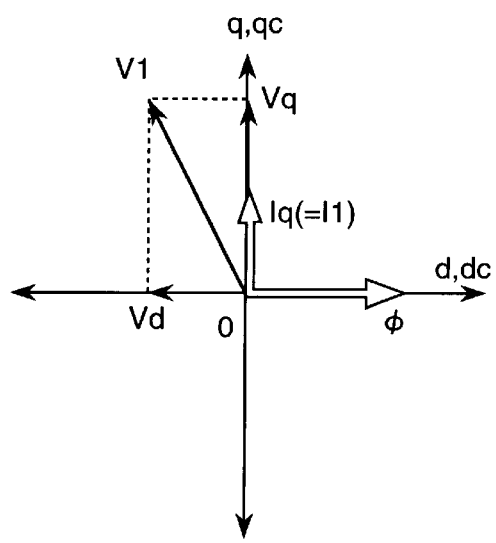
FIG. 24 shows a vector chart indicating the relationship between the current and the voltage for vector control without an axis error.
Figure 25:
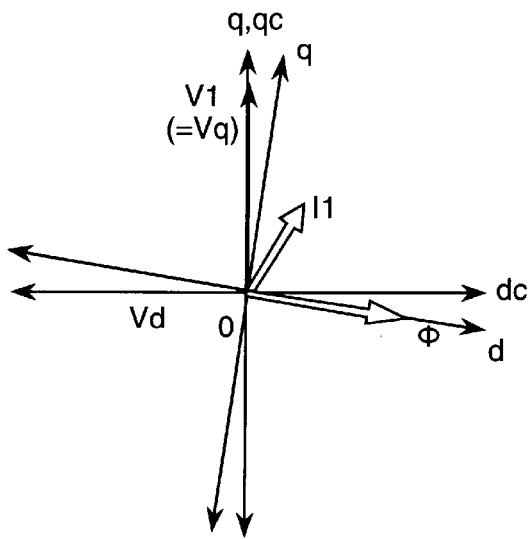
FIG. 25 shows a vector chart indicating the relationship between the current and the voltage for V/F control.

As indicated in Equation (1) and FIG. 3, the voltage commands are calculated using R, Ld, Lq, and Ke, which are parameters of the motor. When these parameters are accurate, the motor operates at a rotation speed and with a current value which are instructed by the command values. If this is the case, the vector chart for the voltage and the current becomes as indicated in FIG. 24, and d/q axes of the motor matches the dc/qc axes for the control.

Though the command values ω1* and Id* are provided for the voltage command calculator 12 independently of the load condition of the motor, the command value Iq* must be provided depending on the torque which the motor requires. When there is a difference between the command value Iq* and the actual torque load, the magnetic pole axis and the control axis are displaced, thereby causing an instability or an insufficient torque.

In the present embodiment, it is important how to create the command value Iq*. Though in the vector control type sensorless method of the prior art, the output of the speed controller is Iq*, the vector control type sensorless method requires a speed estimator and a speed controller, thereby complicating the control structure. To solve the problem, in the present embodiment, the detected current value Iqc is used to create the current command Iq*. In FIG. 1, 11 is the Iq* generator, and the Iq* is calculated with the following equation.

$$Iq^* = \frac{1}{1 + Tr \cdot s} \cdot Iqc \qquad \text{Equation (2)}$$

In the equation above, Tr: Time constant and s: Laplace operator.

Equation (2) is a first order lag filter, and a moving average is also applicable as well. If Iqc is directly applied as Iq*, it acts as positive and the control system becomes unstable. This lagging element is given to restrain a pulsation component to stabilize the control system. The fundamental wave component (i.e. a DC component) of the Iqc matches Iq* in a steady state, the dc/qc axes finally match d/q axes. Thus, with the present embodiment, the relation in the vector chart of FIG. 24 is attained, thereby realizing a driving device for a motor, which does not require adjusting such as gain setting, does not generate an axis error, and is stable. Though the present embodiment does not include a speed controller, with the original characteristic of a synchronous motor, the rotation number of the motor is controlled so as to match the command value, thereby making a steady?state deviation of the speed zero. As described so far, the present invention makes an axis error between the motor and the control zero with a simple control structure.

(Embodiment 2)

Figure 4:
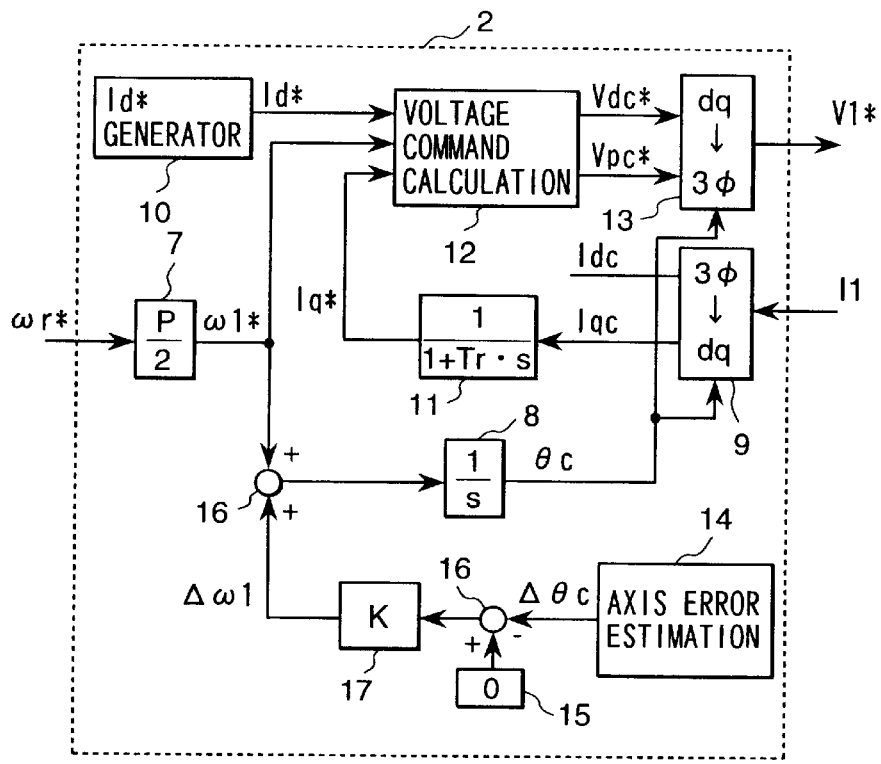
FIG. 4 shows a block diagram for Embodiment 2.

In the present embodiment, a controlling device 2B in FIG. 4 is used in place of the controlling device 2 in FIG. 1.

In FIG. 4, 14 is an axis error estimator estimating and calculating an axis error between d/q axes of the motor and dc/qc axes of the control axes. 15 is a zero generator providing the axis error with a zero command. 16 is an adder adding (or subtracting) input signals. 17 is a magnetic pole estimation gain calculating a correction value for the electric angular frequency command ω1* using the axis error.

The following section describes the operation of the present embodiment. The axis error estimator 14 estimates and calculates an error Δθ between d/q axes and the dc/qc axes. Δθ is an error component of the dc/qc axes observed from d/q axes as indicated in FIG. 23. Δθc, which is an estimated value of Δθ, is calculated with Equation (3).

$$\Delta\theta c = \tan^{-1} Vdc^* - R \cdot Idc - \frac{\omega_1 L \cdot Iqc}{Vqc^* - R \cdot Iqc - \omega_1 L \cdot Idc} \qquad \text{Equation (3)}$$

In the equation above, L=Ld=lq and a non-salient type motor is assumed. Equation (3) directly estimates and calculates Δθ based on the motor parameters, a voltage command impressed on the motor, and detected current values (observed values on the dc/qc axes). Though equation (3) is assumed to be applied to a non-salient type synchronous motor, it is known that a similar equation can be applied to obtain an axis error for a salient type motor, and "Proceedings for Joint Workshop of Semiconductor Power Conversion/Industry Power Electric Application of Institute of Electrical Engineers of Japan, No. SPC-00-67, Position Sensorless Control for IPM Motor with Direct Axis Error Estimation" includes a description, for example.

Figure 23:
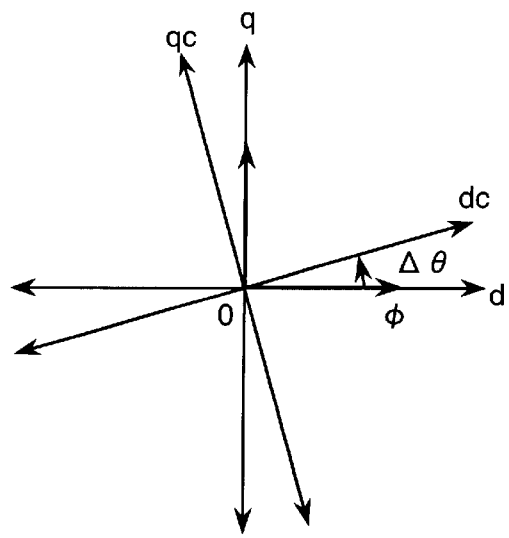
FIG. 23 shows a vector chart indicating the relationship among d/q axes in the motor, dc/qc axes in the controlling device, and the axis error AO.

When the axis error Δθc is positive, as in FIG. 23, the control axes dc/qc advances with respect to d/q axes, a correction value Δθ1 (in this case, Δθ1<0) is added to decrease the electric angular frequency θ1* to reduce Δθ. When the axis error Δθc is negative, the correction value Δθ1 is added to increase the electric angular frequency θ1*. Blocks 14 to 17 in FIG. 4 realize these operations (PLL operation). Though the magnetic pole estimation gain 17 determines a converging time for the axis error Δθc, and is basically a proportional gain, combined proportional element, integral element, and integral element can be used.

With the present embodiment, when an axis error occurs from a load fluctuation, the axis error Δθc converges to zero within a prescribed response time. In the present embodiment, since the magnetic pole estimation gain can be increased, a response capability to a torque fluctuation such as a load disturbance improves, With this embodiment, follow-up capability to the speed command is also improved. With the PLL operation, when the axis error Δθc becomes zero with a high response speed, the output Δθ1 from the magnetic pole estimation gain 17 becomes zero, and a driving frequency of the motor matches the electric angular frequency θ1*, thereby converging a speed deviation to zero in a short period, resulting in improving the follow-up capability to the speed command.

Though the present embodiment describes a method for directly obtaining the axis error Δθ, a method for indirectly obtaining a state quantity corresponding to the axis error can apply without any problems. For example, calculating only the numerator of Equation (3), and correcting the electric angular frequency θ1* based on the obtained value do not present any problems. The magnetic pole position can be estimated by applying a harmonic wave as well.

(Embodiment 3)

Figure 5:
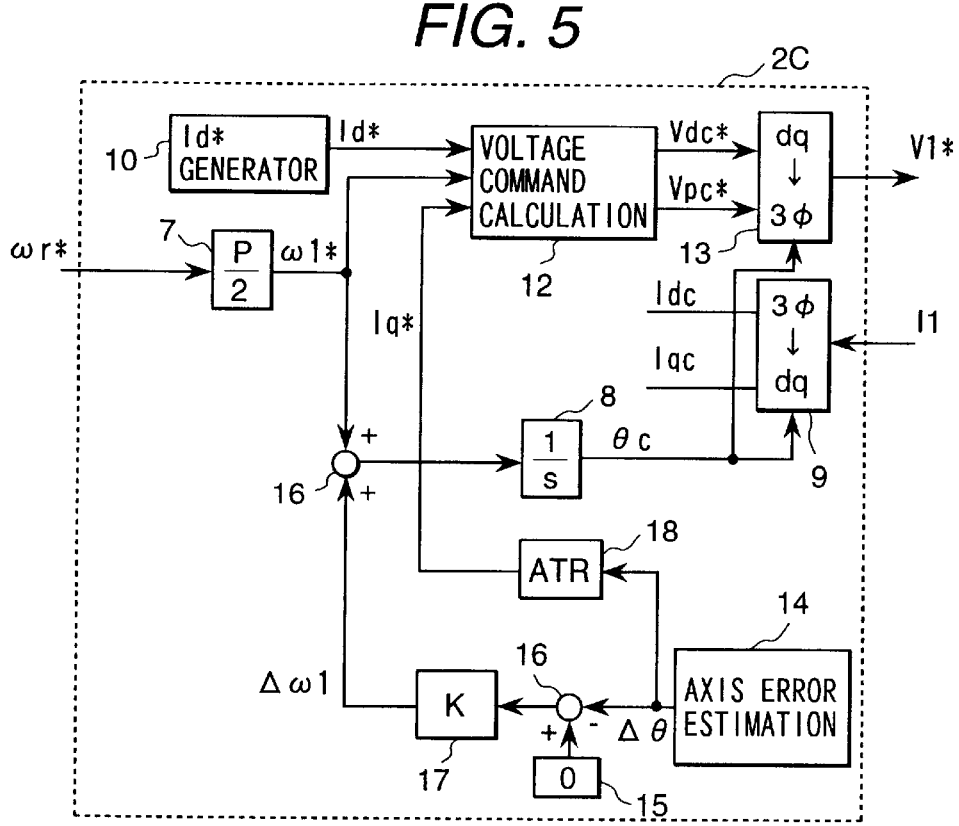
FIG. 5 shows a block diagram for Embodiment 3.

In the present embodiment, a controlling device 2C in FIG. 5 is used in place of the controlling device 2 in Embodiment 1. 18 is a torque controller calculating the q axis current command Iq* based on the estimated value of the axis error Δθc in FIG. 5. The difference of the present embodiment from Embodiment 2 is that the Iq* generator 11 is removed, and a torque controller 18 is added.

The following section describes the operation of the present embodiment. The present embodiment determines the current command Iq* using the estimated value for the axis error Δθc. The phase θc of AC voltage impressed on the motor is mainly given by integrating the electric angular frequency ω1*. When a load changes suddenly, the estimated value for the axis error Δθc changes first. Though the electric angular frequency ω1* is corrected through the magnetic pole estimation gain 17, it takes a period corresponding to a response set for the PLL until it reaches the actual speed. Immediately determining the current command Iq* from a change in the estimated value for the axis error Δθc enables a torque control with a high response. Since the estimated value for the axis error Δθc becomes zero in a steady state, the torque controller 18 requires an integral element. Thus the torque controller 18 is constituted based on PI (Proportional and Integral) control or PID (Proportional, Integral, and Differential) control.

The present embodiment immediately obtains the current command according to a torque change by adding the torque control block 18, thereby realizing a driving device for a motor with a better performance.

(Embodiment 4)

Figure 6:
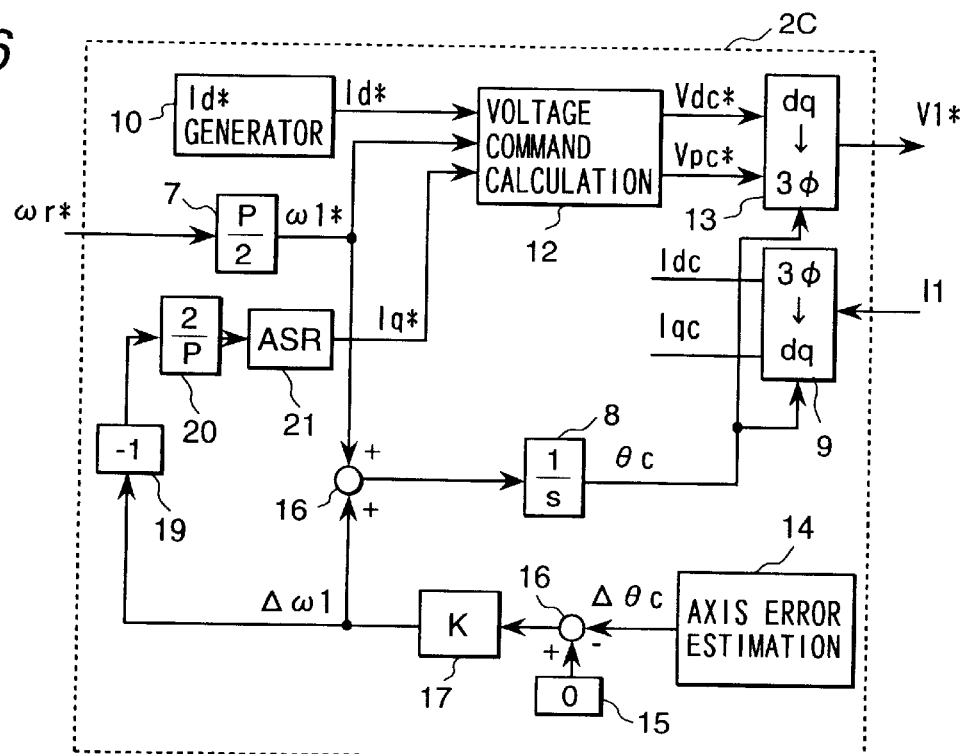
FIG. 6 shows a block diagram for Embodiment 4.

In the present embodiment, a controlling device 2D in FIG. 6 is used in place of the controlling device 2 in Embodiment 1. In FIG. 6, 19 is an inverting gain for inverting the sign of a signal. 20 is a conversion gain for converting the electric angular frequency into the mechanical angular frequency. 21 is the speed controller controlling the speed of the motor to be constant. The difference of the present embodiment form Embodiment 3 is that the torque controller 18 is removed, and 19 to 21 are added.

FIG. 6 describes the operation of the present embodiment. Though Embodiment 3 uses the estimated value for the axis error Δθc to create the torque current command Iq*, the present embodiment uses the output Δω1 from the magnetic pole estimation gain 17 to create the torque current command Iq*. A motor driving system includes applications where the speed accuracy is important. For example, speed synchronization for multiple motors is strongly required in auxiliary rolling machines in a steel rolling system. For such applications, follow-up capability of speed is more important than torque disturbance response.

Figure 21:
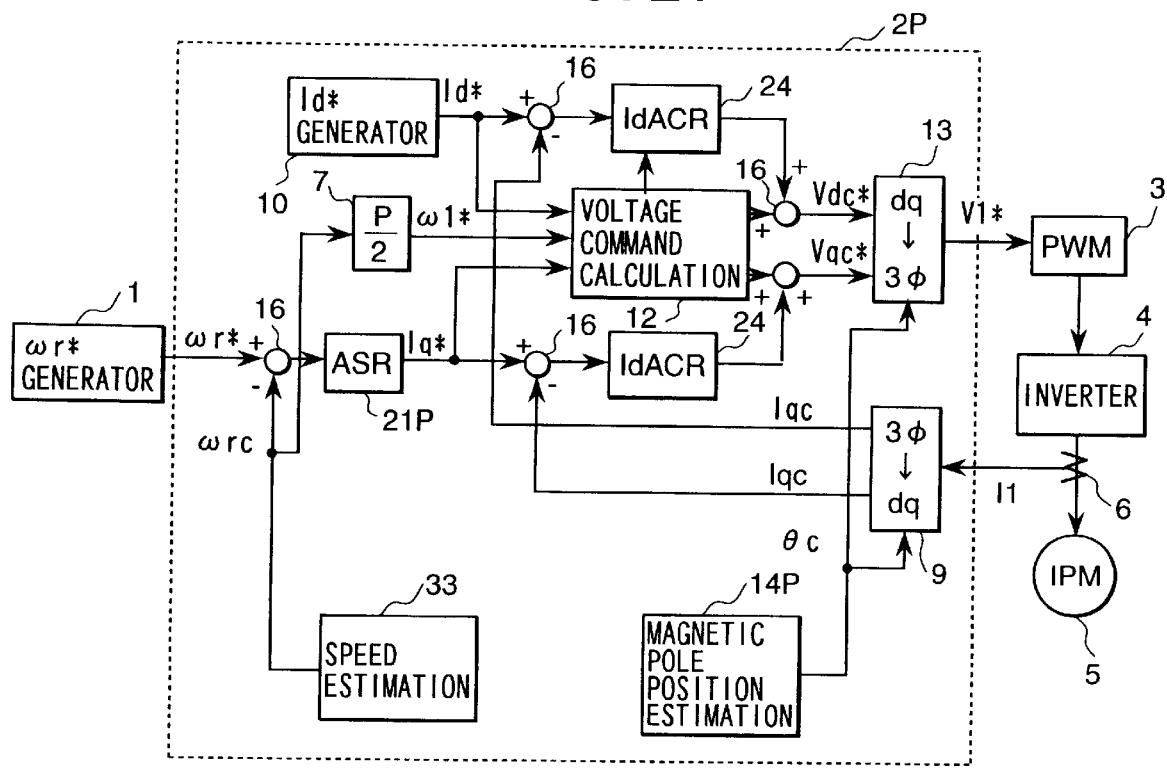
FIG. 21 shows a block diagram for a synchronous motor vector control driving system of previous art.
Figure 22:
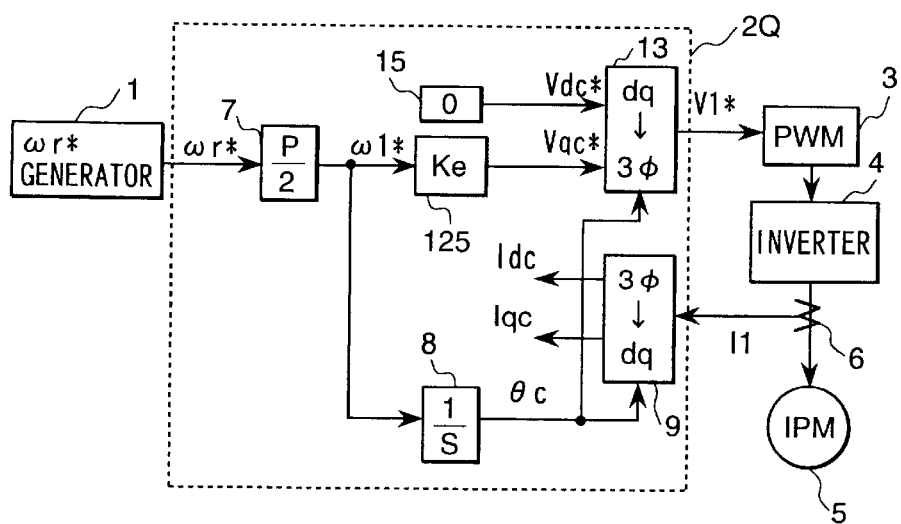
FIG. 22 shows a block diagram for a synchronous motor V/F control driving system of previous art.

In the present embodiment, a speed controller 21 is provided to create the torque current command Iq* for converging a speed deviation to zero immediately. However, if a speed estimator as in the prior art (FIG. 21) is added, the controlling device becomes complicated. In the present embodiment, Δω1, which is a correction value of ω*, is used for the speed control.

The output Δω1 from the magnetic pole estimation gain 17 becomes positive when the actual speed of the motor is larger than the speed command in the controlling device, and is inverted through the inverting gain 19. This makes the inverted output equivalent to the input (speed deviation) in the speed controller (speed controller 21P in FIG. 21) of the prior art. With the conversion gain 20, Δθ1 is divided by the number of pole pairs of the motor to convert into a deviation in the mechanical angular frequency. Finally, with the speed controller 21, Iq* is calculated. In the present invention, the control (PI control or PID control) used for the speed control of the prior art is directly applied to the speed controller 21. With the present embodiment, a motor driving system with an excellent speed follow-up capability is realized by constituting the speed controller based on Δω1, which is a correction value for the AC phase.

(Embodiment 5)

Figure 7:
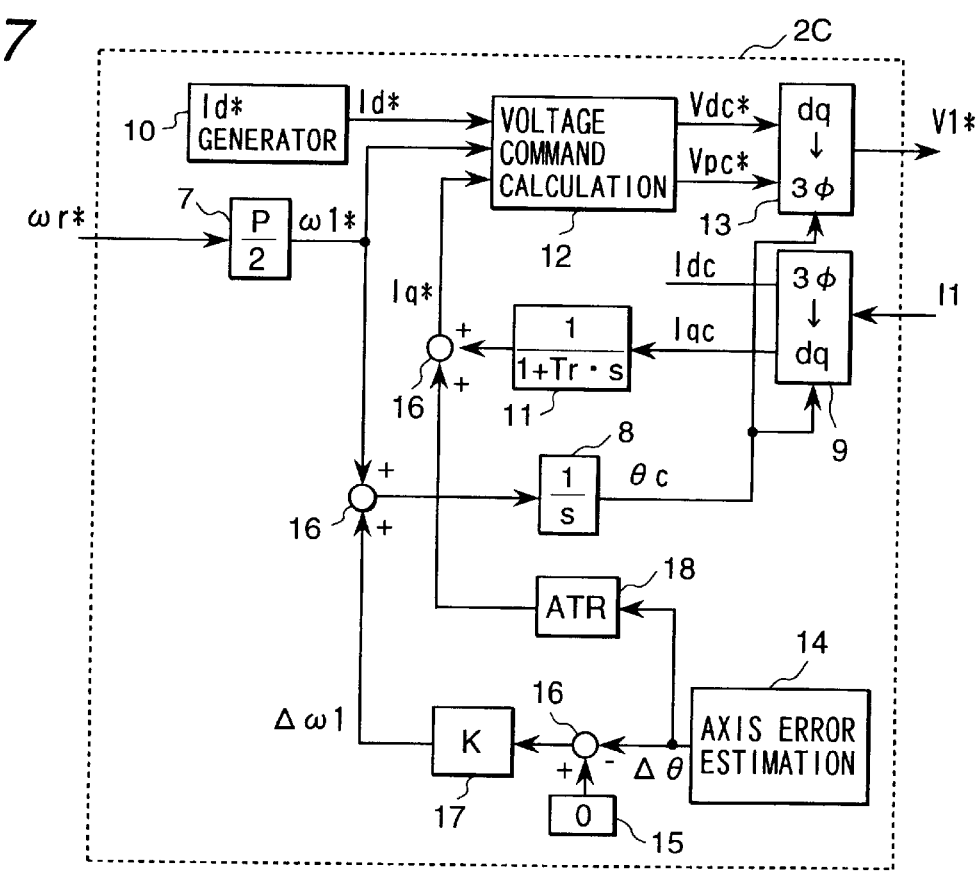
FIG. 7 shows a block diagram for Embodiment 5.

In the present embodiment, a controller 2E in FIG. 7 is used in place of the controller 2 in Embodiment 1. In FIG. 7, 18E is a torque controller without an integral element.

In the present embodiment, the Iq* generator 11 is added to Embodiment 4. As described before, since the Iq* generator always converges to Iqc=Iq*, it compensates the steady state characteristics. The present embodiment combines the Iq* generator 11 to improve characteristics both in a steady state and a transient state.

Since the Iq* generator 11 is responsible for the entire current command Iq* in a steady state, the torque controller 18E in FIG. 7 should function only for a transient response. Thus these controllers are not provided with an integral element, are constituted by combining a proportional component and a differential (incomplete differential) component, and should not have a gain for DC. With the present embodiment, a driving system for a motor, which satisfies both the steady state characteristics and transient characteristics is provided.

(Embodiment 6)

Figure 8:
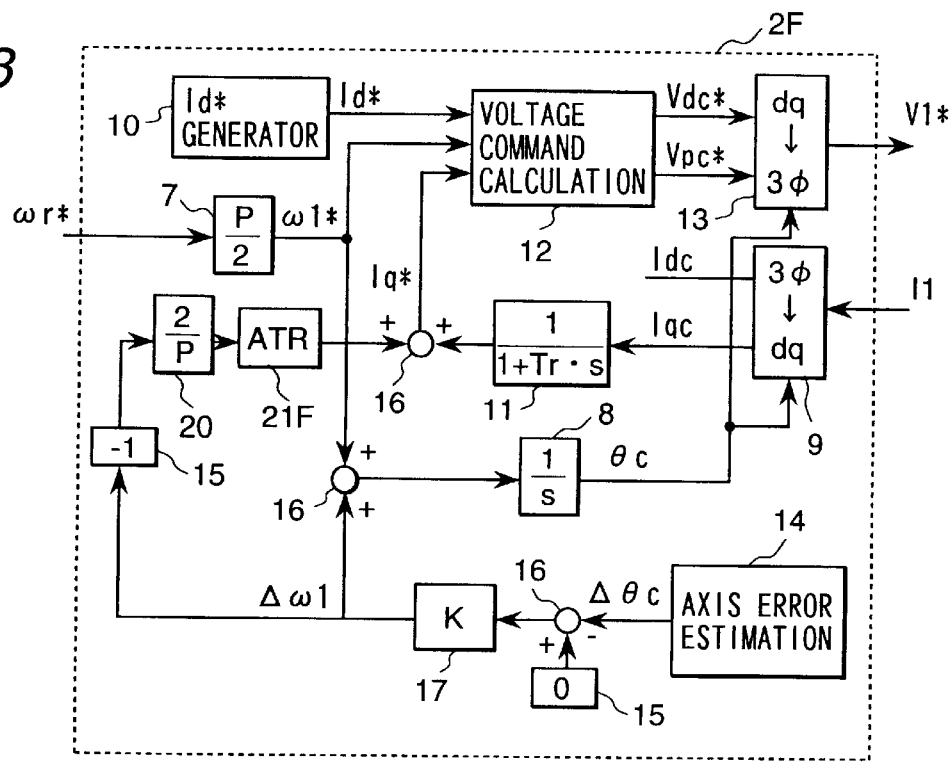
FIG. 8 shows a block diagram for Embodiment 6.

In the present embodiment, a controlling device 2F in FIG. 8 is used in place of the controlling device 2E in Embodiment 5. The other part is the same as Embodiment 5. In FIG. 8, 21F is a speed controller without an integral element. The present embodiment provides a motor driving system satisfying both the steady state characteristics and the transient characteristics as Embodiment 5.

(Embodiment 7)

Figure 9:
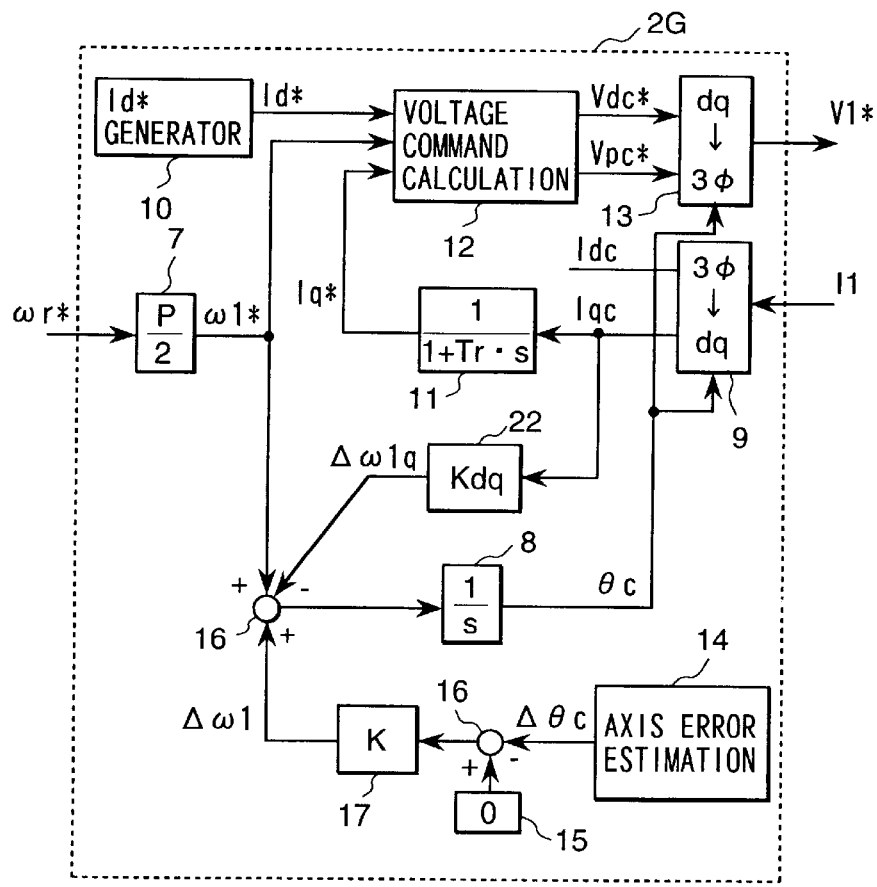
FIG. 9 shows a block diagram for Embodiment 7.

In the present embodiment, a controlling device 2G in FIG. 9 is used in place of the controlling device 2 in Embodiment 1. In FIG. 9, 22 is a q axis damping gain using the detected current value Iqc for qc axis to correct the electric angular velocity ω1*. The present embodiment is added with the q axis damping gain 22 to Embodiment 2 in FIG. 4.

The following section describes the operation of the present embodiment. Embodiments 1 to 6 add a correction to Iq* as a countermeasure to a load fluctuation or a speed fluctuation to make the control to follow a load (to provide torque corresponding to the load). The present embodiment is practical for an application where preventing a trip due to an over current during the torque fluctuation is given the top priority while the follow-up capability to the load fluctuation is not placed emphasis on, in other words, a stop caused by an over current should be avoided while more or less decreases in the speed and the torque are permissible.

The following is a voltage equation for the motor.

$$Ld\frac{d}{dt}Id = -R \cdot Id + \omega1 Lq \cdot Iq + Vd \qquad \text{Equation (4)}$$

$$Lq\frac{d}{dt}Iq = -\omega1 \cdot Ld \cdot Id - R \cdot Iq + Vq - ke \cdot \omega1$$

Iq is represented as below.

$$Iq = \frac{-\omega1 \cdot Ld \cdot Id + Vq - Ke \cdot \omega1}{R + s \cdot Lq} \qquad \text{Equation (5)}$$

Thus, when a load is applied and the speed of the motor decreases, a term for an induced voltage of the motor (ω1·Ke) decreases, resulting in increasing Iq. When the decrease of the speed due to the load fluctuation is large, excessive Iq flows, and a problem due to the over current (stop of inverter, break-down of element) may be susptected. Since a sudden change of Iq means a presence of a load fluctuation, when Iqc changes, $\omega 1^*$ in the controlling device is immediately corrected to restrain excessive Iq. When the induced voltage of the motor $\omega 1 \cdot Ke$ decreases, and Vq in Equation (5) decreases simultaneously, the increase of the current is restrained. For that purpose $\Delta\omega 1q$ is designated as the correction value of $\omega 1^*$, and a value proportional to the changing rate of Iqc is subtracted from $\omega 1^*$. More specifically, a lead element such as the differentiation or the incomplete differentiation of Iqc is used for the compensation.

As the result, during a load fluctuation, though the torque and the motor speed decrease, the problem due to the over current is restrained. When the motor decelerates, this embodiment does not present an axis shift, thereby preventing a step out. The present embodiment provides a stable motor driving system hardly presenting an over current trip.

(Embodiment 8)

Figure 10:
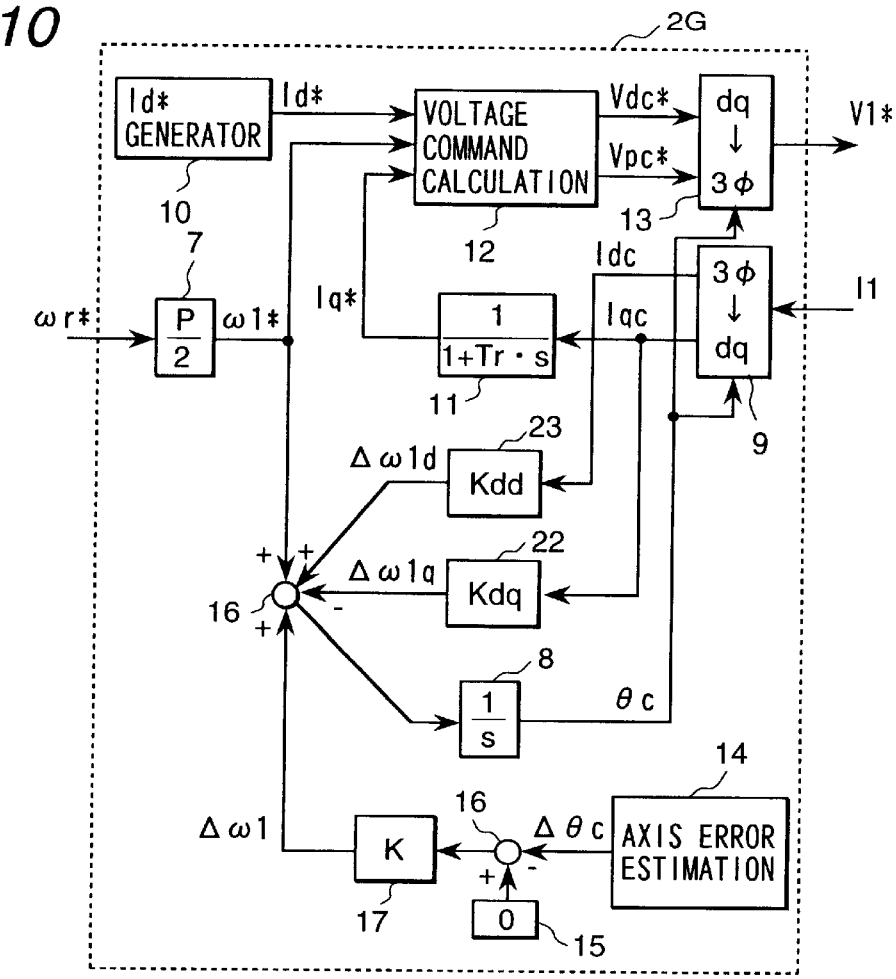
[FIG. 10] A block diagram for Embodiment 8.

In the present embodiment, a controlling device 2H in FIG. 10 is used instead of a controlling device 2 in Embodiment 1. In FIG. 10, 23 is a damping gain for d axis correcting the electric angular frequency $\omega 1^*$ using the detected current value Idc for dc axis. The present embodiment adds the damping gain for d axis 23 to Embodiment 7.

The following section describes the operation of the present embodiment. The present embodiment restrains an over current during a load fluctuation and a speed fluctuation as Embodiment 7. In the present embodiment, Idc in addition to Iqc is used to correct $\omega 1^*$. In FIG. 10, the damping gain 23 for d axis receives Ids, and provides a compensation amount $\Delta\omega 1d$ corresponding to the fluctuating amount to add it to $\omega 1^*$.

Figure 11:
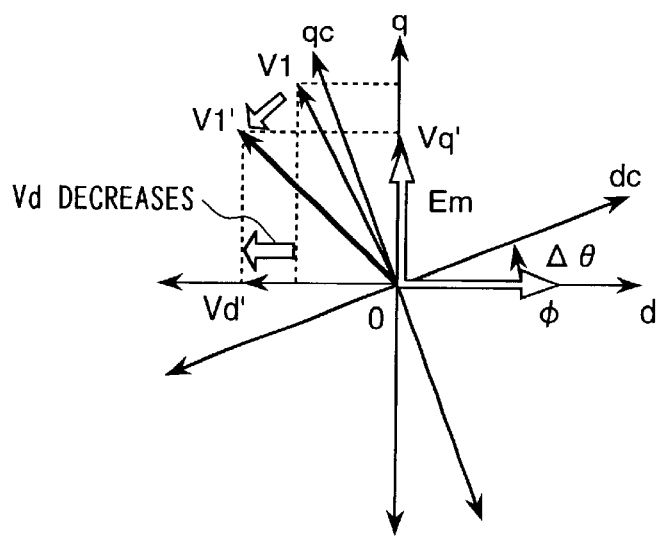
FIG. 11 shows a vector chart indicating an effect of the voltage command when an axis error AO is present.

When a load fluctuation of the motor is present, as in the vector chart in FIG. 11, an error $\Delta\theta$ is generated between d axis, which is the actual axis of the motor, and dc axis, which is an control axis. Though $\Delta\theta$ converges to zero with the PLL function of the present invention, the current may fluctuates and increases to cause an over current trip during this period. The effect of $\Delta\theta$ appears on d axis as well as the q axis current. The relation between the voltage vector V1 and V1' when no axis error is present and after an axis error occurs is shown in FIG. 11. Vd', the voltage component on the d axis decreases due to the axis shift. This causes a large change of Id toward minus direction. Especially, an effect on Id caused by a change of Vd becomes larger for a reverse salient motor (Ld<Lq) having a small Ld.

Using the phenomenon described above, a magnitude of a load fluctuation is obtained from a change in Idc. Using the value of Idc, and adding a value proportional to the differentiation or the incomplete differentiation of the Idc to $\omega 1^*$ to reduce a axis error, thereby restraining problems such as over current. When the load increases, since Id decreases to minus, $\Delta\omega 1d$ is added directly for compensating $\omega 1^*$. Since the present invention, which uses an Iq* generator and the like, does not present a steady state axis shift, it is not required to strictly adjust the setting for the damping gain for d axis, and the damping gain for d axis should be adjusted only to restrain over current. With the present embodiment, an action against over current during a load fluctuation is taken with more sensitivity, thereby providing a stable motor driving system.

(Embodiment 9)

Figure 12:
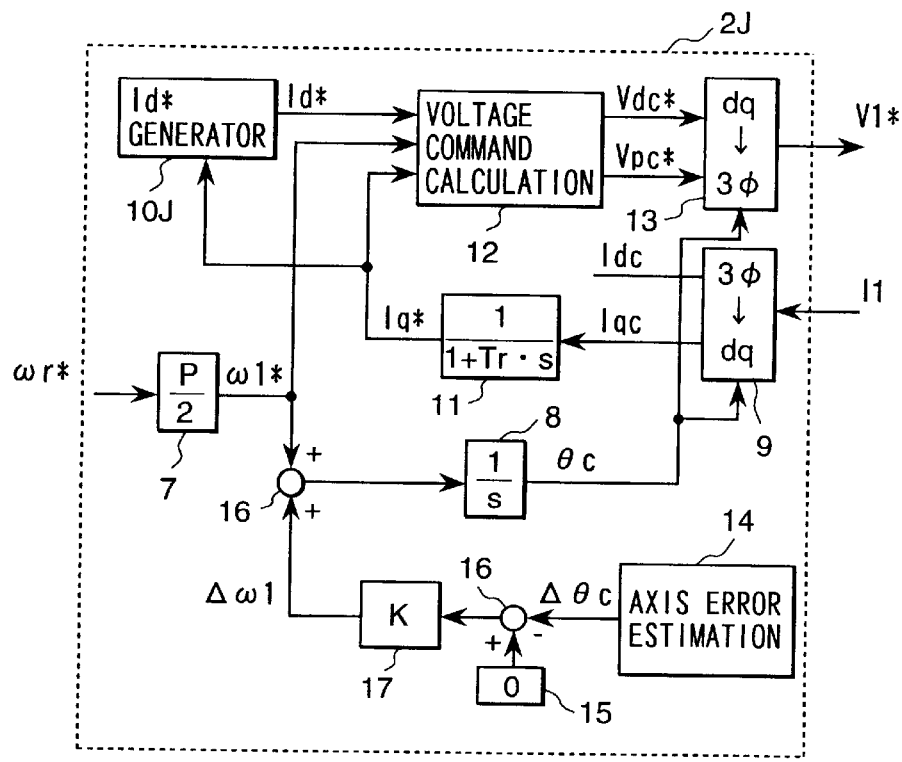
FIG. 12 shows a block diagram for Embodiment 9.

In the present embodiment, a controlling device 2J in FIG. 12 is used in place of a controlling device 2 in Embodiment 1. In FIG. 12, 10J is an Id* generator determining the value of Id* based on Iq*.

The following section describes the principle of the operation of the present embodiment. Some permanent magnet type motors combine torque form permanent magnet with reluctance torque generated by a saliency (reverse salience) of a motor to generate motor torque. For these motors, the maximum torque point exists at a point where the Id is controlled to minus, and controlling such that Id=0 is not preferable with respect to efficiency. When a motor is driven at the maximum efficiency, the motor should always be driven such that the maximum torque is provided. The condition to provide the maximum torque is represented with Equation (6).

$$Id = \frac{\Phi m}{2(Lq - Ld)} - \sqrt{\frac{\Phi m^2}{4(Lq - Ld)^2} + Iq^2} \qquad \text{Equation (6)}$$

In the Equation above, $\Phi m$: Permanent magnet magnetic flux, $Ld \neq Lq$.

When Iq is specified, Id for obtaining the maximum torque is determined. In the present embodiment, an Id* generator 10J processes the calculation represented by Equation (6). As the result, driving a motor at the maximum torque (maximum efficiency) is always realized.

For the calculation represented by Equation (6), though Iqc may be used instead of Iq*, Iqc fluctuates largely during transition, resulting in instability in the entire control system. If the maximizing efficiency is available in a steady state, energy saving for a device is achieved. Thus, using Iq*, which is output from the Iq* generator does not cause any problems. The present embodiment provides a motor driving system for operating at the maximum efficiency of a motor.

(Embodiment 10)

Figure 13:
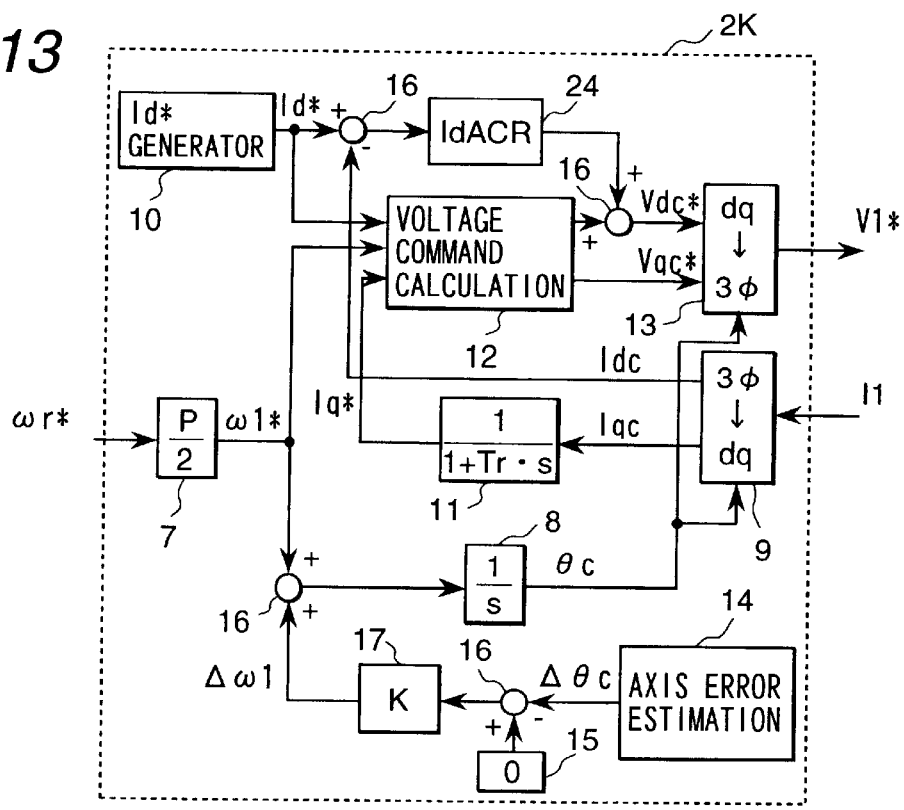
FIG. 13 shows a block diagram for Embodiment 10.
Figure 15:
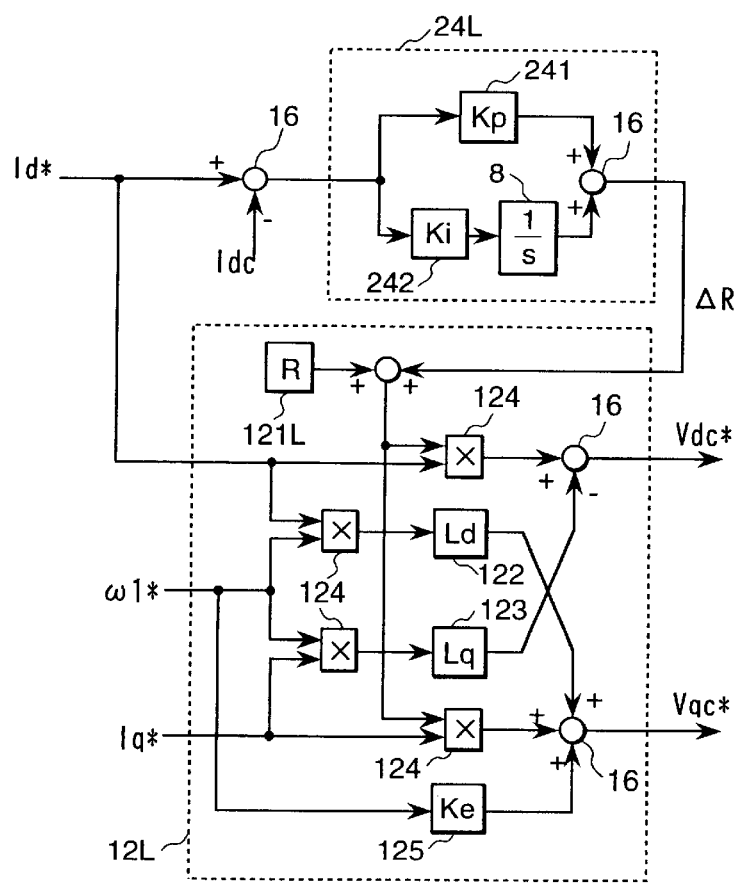
FIG. 15 shows block diagrams for the current controller and the voltage command calculator of Embodiment 11.

In the present embodiment, a controlling device 2k in FIG. 15 is used in place of the controlling device 2 in Embodiment 1. In FIG. 13, 24 is a current controller for matching the value of Idc with Id*.

The following section describes an operation principle of the present embodiment. As described in Embodiments 1 to 9, since the present invention allows eliminating a speed controller which is required in the prior art, the control system is simplified, thereby providing a motor driving system having less parts to be adjusted. The problem here is how to create a command for the torque current Iq. In Embodiments before, mainly Iqc is used to create Iq*. On the other hand, since Id* is provided independently to the speed and the load torque, an arbitrary command current can be set. (set to zero unless maximizing the efficiency in FIG. 12). Thus, for Id, a conventional current controller can be added.

As described in Equation (4), there is an interfering term between d axis and q axis of a motor. As $\omega 1$ increases, the interference between the d axis and q axis increases, thereby presenting a vibration during a transition. Iq* does not have a capability for restraining the vibration, since Iq* is obtained by applying a large filter to Idc. Adding the current controller 24 to Idc provides a function for restraining the interfering term between d and q axes. Since Idc is tried to match Idc* (constant value), the vibration is tend to be restrained. As the result, the stability and the response of the entire control system improve. In the present embodiment, adding the current controller to d axis provides a motor driving system for improving the response of the entire control system.

(Embodiment 11)

Figure 14:
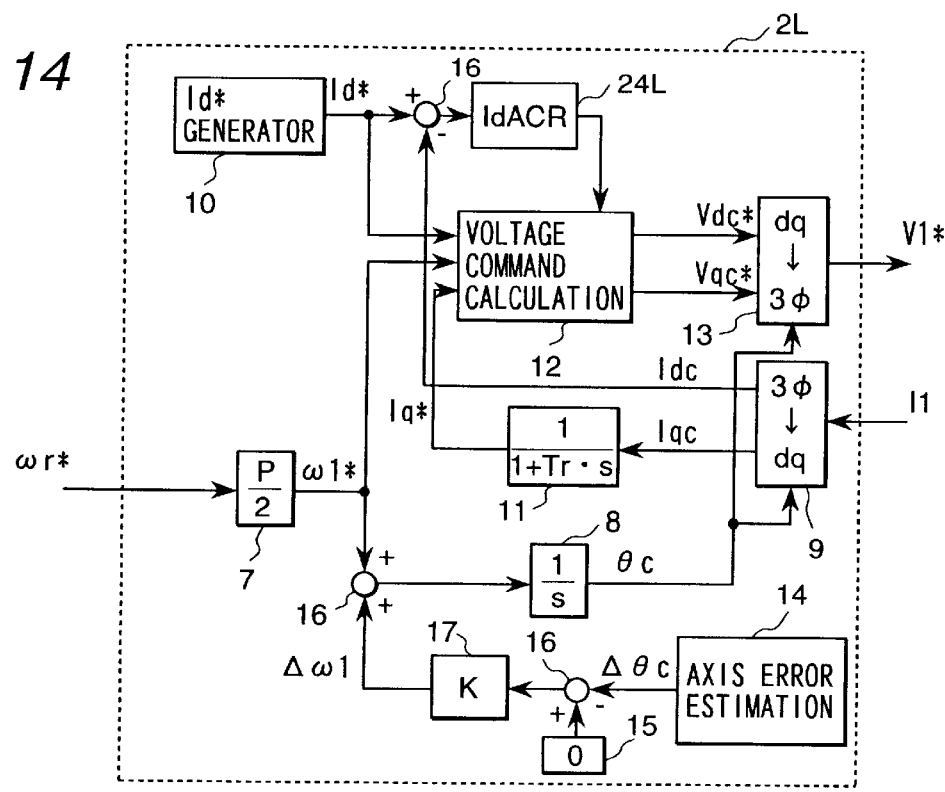
FIG. 14 shows a block diagram for Embodiment 11.

In the present embodiment, a controlling device 2L in FIG. 14 is used in place of the controlling device 2 in Embodiment 1. In FIG. 14, 12L is a voltage command calculator allowing changing control parameters with external signals. 24L is a current controller to change the control parameter to match the value of Idc to Id*. FIG. 15 shows internal structures of the voltage command calculator 12L and the current controller 24L. 121L is a resistance value setter. 241 is a current control proportional gain. 242 is a current control integral gain.

The following section describes the operation of the present embodiment. As described in Embodiment 10, the current controller of Id has a function for improving the response of the control system, and the present embodiment uses the current controller as a device for correcting an error in setting constants. When the actual motor parameters and the motor parameters in the controller match, the integral element of the current controller becomes zero in a steady state and the output of the current controller should be zero. If there is an error in a set value for the parameter, the current controller maintains the value to correct the error. Inversely, the output of the current controller is used to correct the error in the set value.

For a motor, routing a wiring or a resistance in an inverter may cause an error in a resistance. The present embodiment automatically adjust a shift in the resistance setting. In FIG. 15, a difference between Id* and Idc is calculated, and is provided for a current controller 24L comprising a proportional element and an integral element. The output from the current controller 24L is used as a correction value ΔR for a resistor R to correct a resistance value in the voltage command calculator 12L. When Id* matches Idc, the correction of the resistor R is completed. The voltage command calculator 12L corrects a resistance component on q axis as well as that on d axis, thereby increasing the calculating accuracy for the voltage command on both d and q axes. The present embodiment provides a motor driving system automatically adjusting the motor parameters.

(Embodiment 12)

Figure 16:
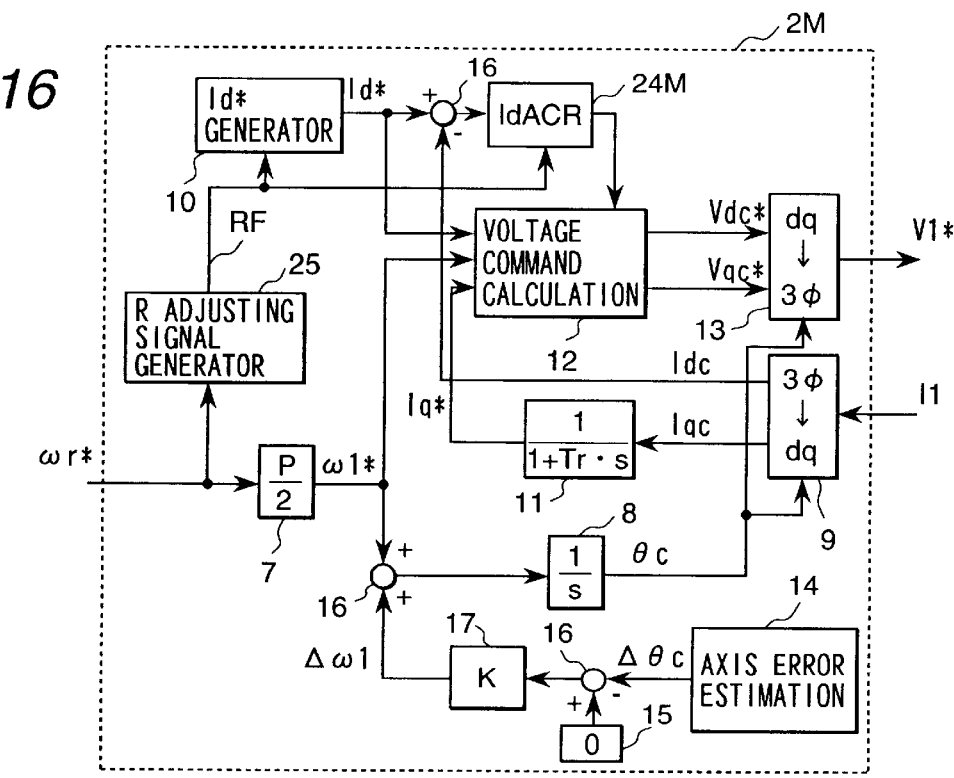
FIG. 16 shows a block diagram for Embodiment 12.
Figure 17:
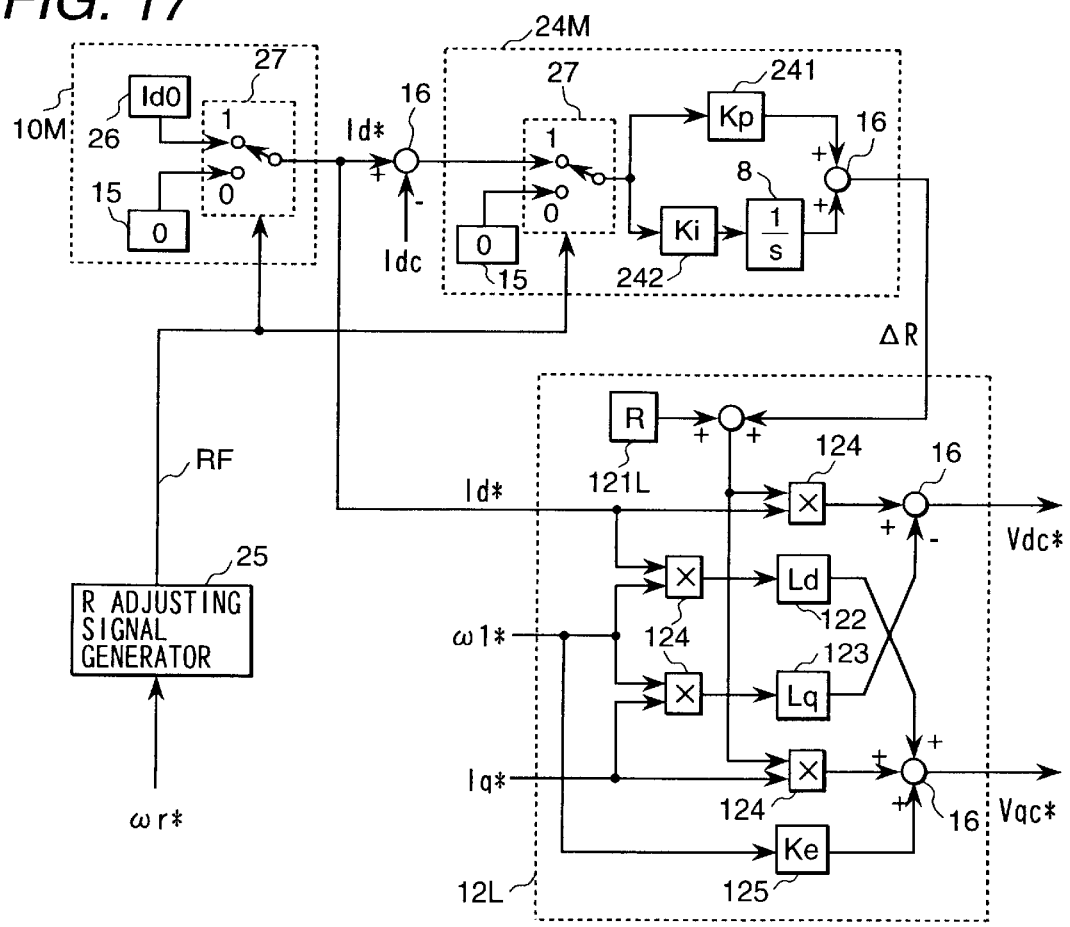
FIG. 17 shows block diagrams for the current controller and the voltage command calculator of Embodiment 12.

In the present embodiment, a controller 2M in FIG. 14 is used in place of the controller 2 in Embodiment 1. In FIG. 16, 10M is an Id* generator switching an internal current command value according to an external signal RF. 24M is a current controller stopping the current control function according to the external signal RF. 25 is an R adjusting signal generator, which provides output "0" when the speed command ωr* is lower than a prescribed value set before hand, and provides output "1" when more than the prescribed value. 26 is a current value setter where a current value used when the resistor setting value is corrected is set. FIG. 17 shows internal structures of the Id* generator 10M and the current controller 24M. In FIG. 17, 27 is a switch, which is switched by the signal RF.

The following section describes the operation of the present embodiment. In Embodiment 11, the current controller is used to automatically adjust the set value of the resistor R in the controlling device. In the present embodiment, the set value for the resistance is corrected based on the inductance and the power generating constant, which change according to magnetic saturation and ambient temperature, in addition to the resistor of the motor. The R signal generator 25 sets a range where the resistance set value is adjusted before hand, and provides a signal RF=1 when the speed command is less than a prescribed value, and RF=0 when the command is more than the prescribed value. An Id* generator 10M receives the RF signal and uses the switch 27 to switch the current command. When RF=0 (correcting the resistor set value), Id*=Id0, and provides current for adjusting the resistance value. When RF=1, the current controller 24M sets the switch 27 to "1" to operate the current controller. When RF=0, it sets the switch 27 to "0", thereby setting the input to the current controller to zero. After the input to the current controller becomes zero, since the value of the integrator 8 is left, the correction value ΔR is maintained for the output.

In the present embodiment, the resistance set value in the controller is corrected under the prescribed value, thereby tuning the resistance value with higher accuracy. As the result, a voltage command calculation with a higher accuracy is realized, thereby increasing the control capability.

(Embodiment 13)

Figure 18:
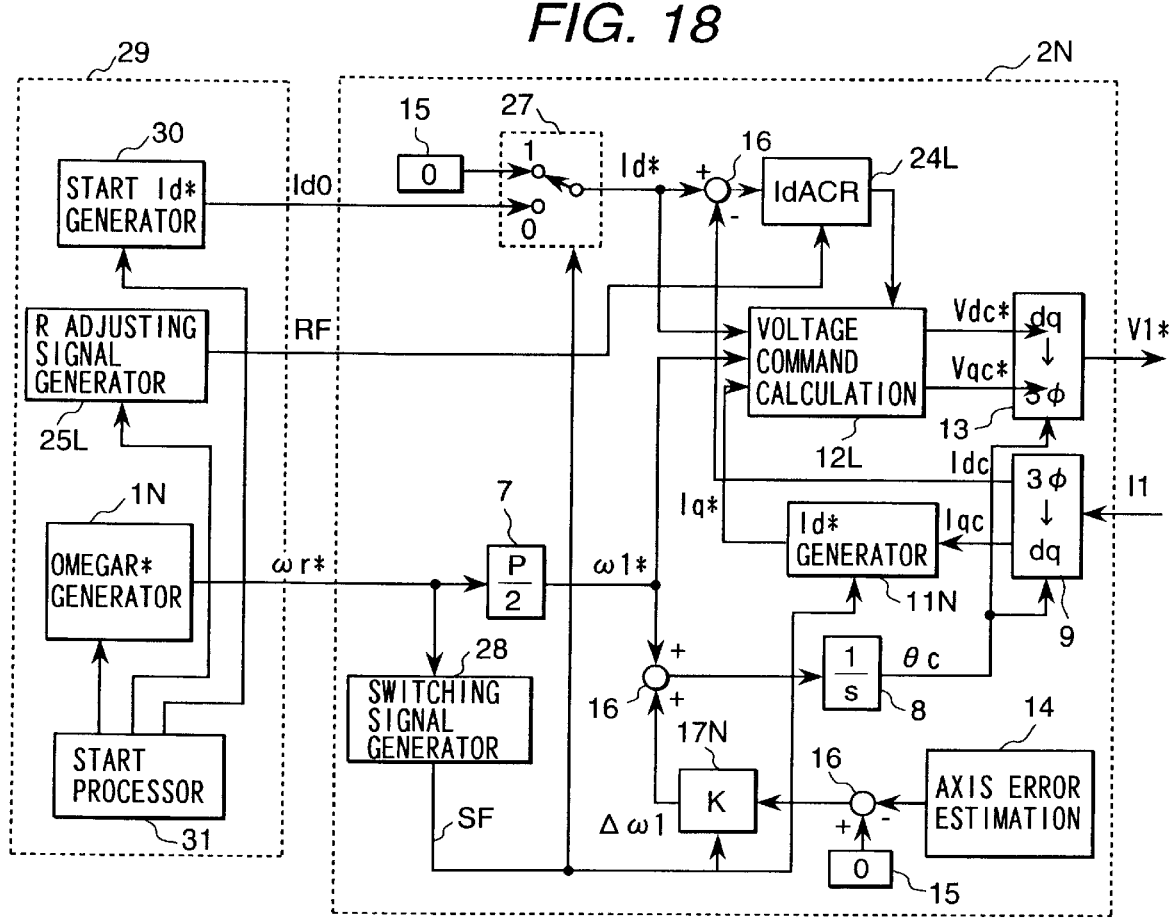
FIG. 18 shows a block diagram for Embodiment 13 of the present invention.
Figure 19:
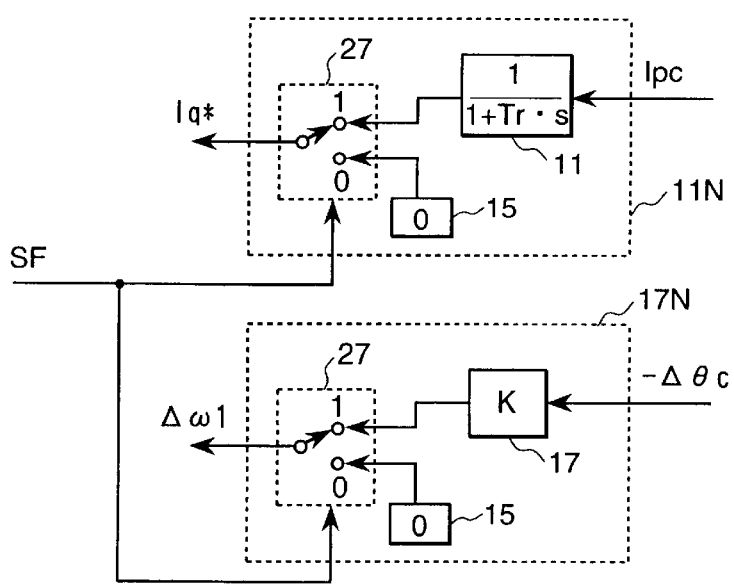
FIG. 19 shows block diagrams for the Iq* generator and the magnetic pole estimation gain of Embodiment 13.
Figure 20:
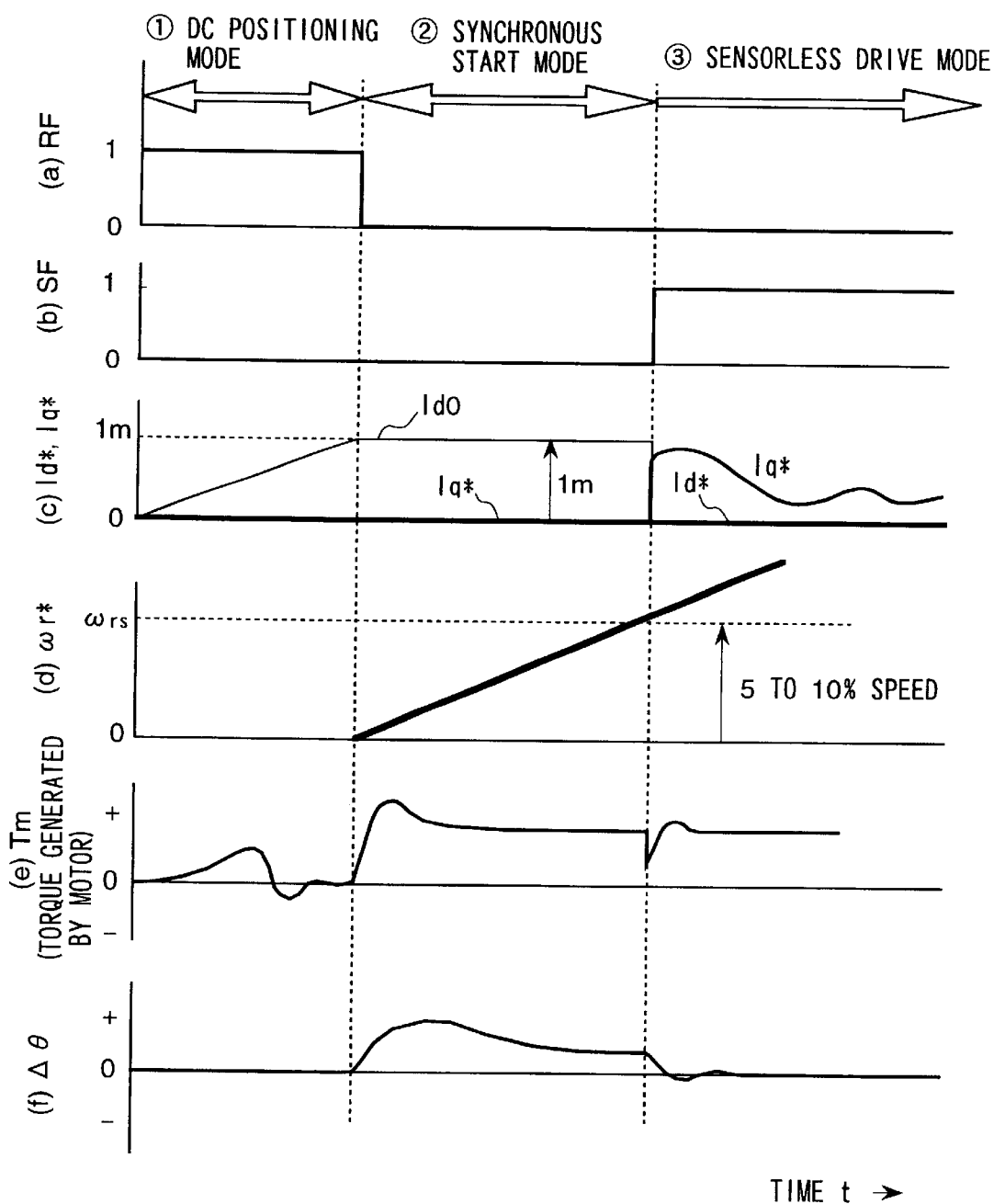
FIG. 20 shows an operation waveform chart of Embodiment 13.

The present embodiment is described using FIGS. 18 to 20. In the present embodiment, a controller 2N in FIG. 14 is used in place of the controller 2 in Embodiment 1. In FIG. 18, 1N is an ωr* generator providing a speed command ωr*. 11N is a Iq* generator switching internal current commands according to an external signal SF. 17N is a magnetic pole estimation gain setting the correction for the AC phase to ON/OFF. 25L is an R adjusting signal generator generating an adjusting signal for the resistance set value. 28 is a switching signal generator receiving a frequency command ωr*, and setting a switching signal SF for the operation mode from 0 to 1 when ωr* exceeds a prescribed frequency. 29 is a start signal generator providing a signal required for staring a motor. 30 is a start Id* generator providing Id* for starting. 31 is a start processor controlling the sequence of the motor when the motor starts.

FIG. 19 shows the details of the Iq* generator 11N and the magnetic pole estimation gain 17N. Both of the blocks include the switch 27, and Iq*=0, and Δω1=0 respectively when the switching signal SF=0. The operations of the Iq* generator 11N and the magnetic pole estimation gain 17N switch to the operations of the Iq* generator 11N and the magnetic pole estimation gain 17N of Embodiments described before when SF=1.

The following section describes the operation of the present embodiment. When a synchronous motor is driven without speed and position sensors, Δθ is calculated to estimate the magnetic pole axis from Equation (3), for example. To calculate Equation (3) with sufficient accuracy, the rotation speed of the motor should be at least 5 to 10% of the rating, and the sufficient calculation accuracy is not obtained because of too small magnitudes of Vdc* and Vqc* when the motor is stationary. In the present invention, the synchronous motor starts in three modes described FIG. 20.

First, DC current is supplied on dc axis for control in "DC positioning mode", thereby moving a rotor to match the magnetic pole axis (d axis) with dc axis. In practice, as in FIG. 20(c), the rotor is positioned by increasing Id* as a ramp. A start Id* generator 30 receives a signal from the start processor 31, and provides Id*. During this period, the resistance value set in the control is corrected simultaneously with the DC positioning. The R adjusting signal generator 25L provides the signal of RF=1, and use the current controller 24L and the voltage controller 12L to to correct the resistance value described in Embodiment 12.

Then, the switching signal generator 29 provides SF=0 to start the motor while Iq*=0, Δω1=0, and Id*=Im (Im: Current value set for the synchronous start) in "Synchronous start mode". As described in FIG. 20(a), the output from the R adjusting signal generator is set to RF=0 to complete adjusting the resistor R simultaneously with the synchronous start. The driving method in the synchronous start mode is equivalent to the conventional V/F control, and the motor is accelerated while an axis shift remains. V/F control simply increases voltage impressed on the motor according to the frequency command ωr*, and starts the motor without a step out by setting a gradual acceleration rate.

Then, the speed command ωr* reaches 5 to 10% of the rated speed of the motor, the output from the switching signal generator 28 switches to SF=1 for sensorless drive mode. Setting to SF=1 switches the switches in the Iq* generator 11N and the magnetic pole estimation gain 17N to "1", thereby making the control constitution equivalent to that of Embodiment 2. As the result, the axis error AO converges to zero, resulting in a stable vector control drive.

The series of start processes in the present embodiment are conducted following a program set in the start processor 31. The present embodiment quickly starts a synchronous motor from a stationary state to a high speed rotation without a speed sensor and a position sensor.

What is claimed is:

1. A driving device for a motor comprising:
   a synchronous motor;
   an inverter impressing an arbitrary AC on said motor;
   a means for detecting a current flowing through said motor;
   a means for providing said motor with a rotation number command;
   a means for calculating AC phase of said motor based on said rotation number command;
   a means for providing a current command Id* on dc axis, which is assumed as a magnetic pole axis inside said motor, and a current command Iq* on qc axis, which is orthogonal to said dc axis; and
   a means for calculating voltage commands on said dc/qc axes based on said current commands and said rotation number command;
   wherein said driving device for a motor sends a control signal to said inverter based on said voltage commands to control said motor, and said Iq* is generated based on a detected current value Iqc on qc axis obtained from a detected current value of said motor when said Iq* of the qc axis component is calculated.

2. A driving device for a motor according to claim 1 further comprising:
   a means for calculating a state quantity corresponding to an axis error between d axis, which is an actual magnetic pole axis of said motor, and said dc axis;
   wherein said state quantity is used to correct said AC phase.

3. A driving device for a motor comprising:
   a synchronous motor;
   an inverter impressing an arbitrary AC on said motor;
   a means for providing said motor with a rotation number command;
   a means for calculating AC phase of said motor based on said rotation number command;
   a means for providing a current command Id* on dc axis, which is assumed as a magnetic pole axis inside said motor, and a current command Iq* on qc axis, which is orthogonal to said dc axis;
   a means for calculating voltage commands on said dc/qc axes based on said current commands and said rotation number command; and
   a means for calculating a state quantity corresponding to an axis error between said d axis, which is an actual magnetic pole axis of said motor, and said dc axis, and correcting said AC phase using said state quantity;
   wherein said driving device for a motor sends a control signal to said inverter based on said voltage commands to control said motor, and said Iq* is generated based on the state quantity corresponding to the axis error between said d axis and said dc axis when said Iq* of the qc axis component is calculated.

4. A driving device for a motor comprising:
   a synchronous motor;
   an inverter impressing an arbitrary AC on said motor;
   a means for providing said motor with a rotation number command;
   a means for calculating AC phase of said motor based on said rotation number command;
   a means for providing a current command Id* on dc axis, which is assumed as a magnetic pole axis inside said motor, and a current command Iq* on qc axis, which is orthogonal to said dc axis;
   a means for calculating voltage commands on said dc/qc axes based on said current commands and said rotation number command; and
   a means for calculating a state quantity corresponding to an axis error between said d axis, which is an actual magnetic pole axis of said motor, and said dc axis, and correcting said AC phase using said state quantity;
   wherein said driving device for a motor sends a control signal to said inverter based on said voltage commands to control said motor, and said Iq* is generated based on a correcting quantity for correcting said AC phase when said Iq* of the qc axis component is calculated.

5. A driving device for a motor according to claim 2 wherein said state quantity corresponding to the axis error is used to correct to said current command Iq* on qc axis.

6. A driving device for a motor according to claim 2 wherein a correcting quantity for correcting said AC phase is used to correct said current command Iq* on qc axis.

7. A driving device for a motor according to claim 1, wherein said AC phase is corrected based on the detected current value Iqc of the qc axis component of said motor.

8. A driving device for a motor according to claim 1, wherein said AC phase is corrected based on the detected current value Idc of the dc axis component of said motor.

9. A driving device for a motor according to claim 1, wherein said current command Id* on dc axis is generated based either on said current command Iq* on qc axis or said detected current value Iqc on qc axis.

10. A driving device for a motor according to claim 1, wherein said voltage commands on dc/qc axes are corrected such that said detected current value Idc on dc axis matches said current command Id* on dc axis.

11. A driving device for a motor according to claim 1, wherein a constant used for calculating said voltage command calculation on dc/qc axes is corrected such that said detected current value Idc on dc axis matches said current command Td* on dc axis.

12. A driving device for a motor according to claim 11 wherein the correction of said constant used for calculating the voltage commands is conducted only when said motor is stationary or is running at a low rotation, and a value corrected during the correcting period of said constant is maintained during starting other than the correcting period.

13. A driving device for a motor according to claim 1, wherein said current commands Id* and Iq* are provided according to prescribed functions when the speed of said motor is at a prescribed speed or less.

* * * * *